2,904,923

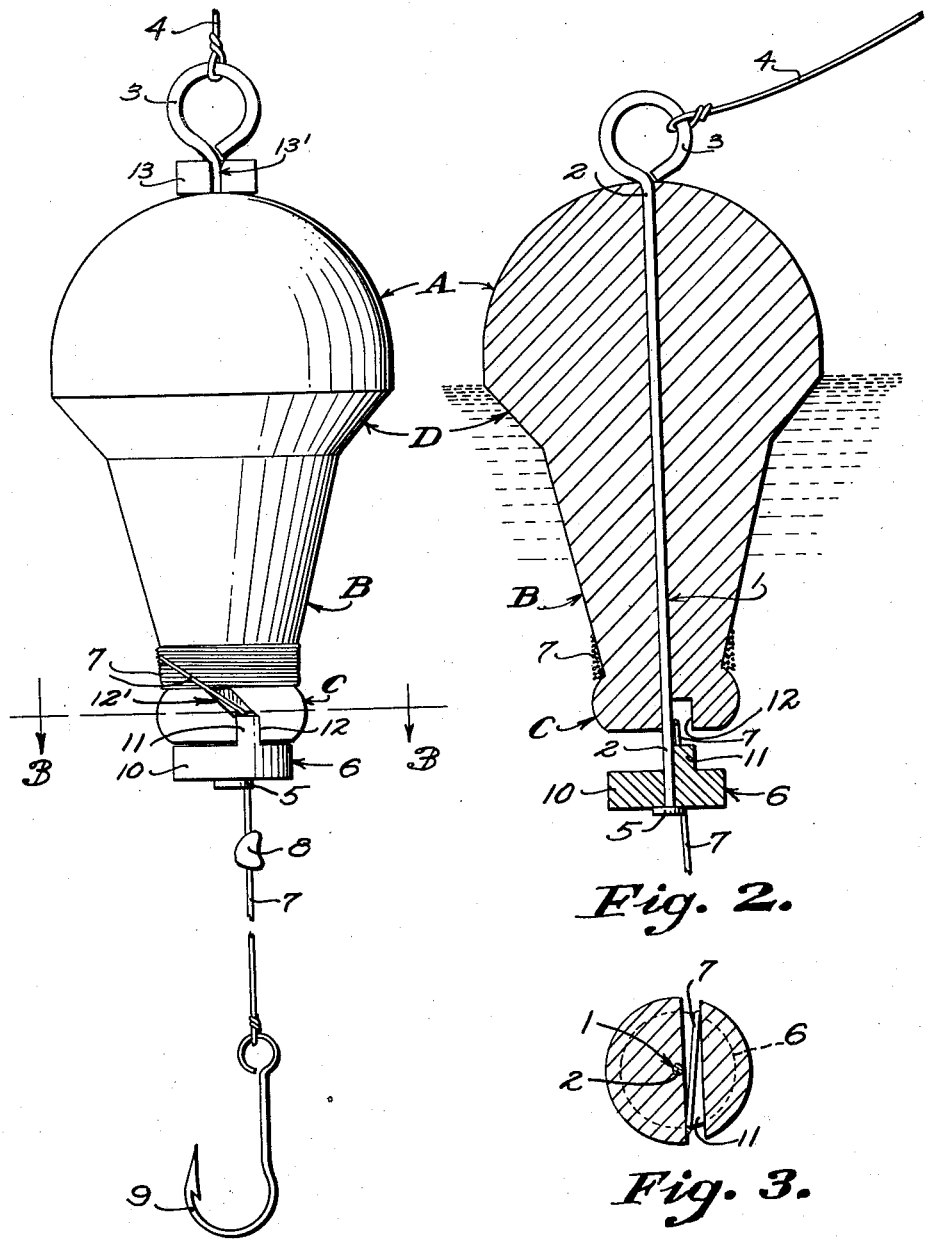

FISHING FLOAT

Abda J. Conyers, Atlanta, Ga.

Application May 8, 1956, Serial No. 583,478

2 Claims. (Cl. 43—43.11)

The present invention provides certain improvements in fishing floats of a type which permits accurate casting of a float and attached fishing line by means of a rod and reel. More particularly, the invention provides a novel casting float adapted to serve as a carrier for casting a fly or other light fishing lure. Such floats may be of substantial size and ordinarily are cast substantial distances through the use of a short casting rod, and it sometimes happens that a fisherman when using this type of rod desires to employ a fly or other lure of such light weight that it cannot be cast or projected through any substantial distance by a short casting rod.

When fishing with a float, or "bobber" as such a float is known customarily, it often becomes desirable to be able to cast the float to a selected spot which is beyond the reach of the fisherman's pole or rod. It is virtually impossible to do this with the portion of the line (termed "leader"), which is to depend from the float in extended position. If the cast is to be accurate and safe from damage to the tackle and personal injuries from an uncontrolled flying hook, this leader portion of the fishing line to which the hook is attached should be retracted, while automatically becoming extended from the float upon completion of the cast.

The present invention therefore has for one of its objects the provision of a fishing bobber, or float which has the advantage of being of such a nature that it can be cast as easily and as accurately as a practice plug by means of a casting rod and reel and having additionally the added advantage of dropping the hook end of the leader line directly beneath the float wherever it is cast.

A further object of the invention is to make a float of the indicated character in the shape of a spool, smaller at one end which is the lower end when the float is in use, for streamlining the float to facilitate its casting, and also for facilitating the spinning off of the leader line when the line is released upon the float hitting the water.

A further principal object of this invention is the provision of a float of this charatcer formed at its lower end with an annular enlargement which is provided with an off center transverse slot, a fishing line attaching spindle or rod of greater length than the float extends longitudinally therethrough, and loosely mounted on and retained by a flattened head or screw nut on the end of said spindle is a clamp member having an upstanding locking tongue adapted to engage in said slot and lock the lead line in wound position about the lower end of the float to hold the hook and sinker end of the lead line retracted beneath and substantially close to the end of the float by upward movement of said spindle or rod, and to maintain the clamp member during the casting operation, the clamp member and lead line being automatically released to permit unwinding of said lead line upon the float striking the water.

The improved construction of the fishing float is illustrated in the accompanying drawings which show an exemplary embodiment of the improvements of the invention, in which:

Fig. 1 is an elevation of the improved float or bobber when in condition ready to be cast;

Fig. 2 is a vertical section of the float shown in Fig. 1, the view showing the position of the structural parts thereof when it is floating in water;

Fig. 3 is a horizontal sectional view through the smaller lower end portion of the float, the view being taken on the line 3—3 of the Fig. 1, looking in the direction of the arrows.

Referring more particularly to the drawings the illustrative embodiment of the improved fishing float is shown as being composed of an enlarged top head portion or section A and a smaller tapering bottom or lower section B, which tapers downwardly to an enlarged collar portion C forming the end of section B and of the float. The upper section A and lower section B are substantially circular in cross section, the upper and lower sections being connected by an intermediate section D which is relatively short and tapers inwardly and downwardly, the bottom section being longer than the top section and proportioned thereto so that the center of gravity of the float will be below the intermediate section D so that the float will remain upright when floating in the water, as indicated in Fig. 2 of the drawings. The float is made from any suitable material such as plastic, cork and the like, which is lighter than water but preferably is made of wood.

The float is provided with an axial bore 1 which extends longitudinally through the float and which slidably receives a metal spindle rod 2, which is longer than the float, the upper end of rod 2 being bent into an eye or loop 3 for attachment of a fishing line 4 thereto, and its bottom end has a flange or collar 5, which retains latch member 6 on the rod (or spindle) 2, and which performs a function to be described hereinafter.

The collar C at the bottom end of the float, being larger in diameter than adjacent portions of the lower section B of the float retains the leader line 7 which is wound around section B at the collar C, a weight 8 and hook 9 being attached to the leader line 7 which is prevented from premature unwinding during handling of the float by the latch or locking means 6 being held in locking position by a spacer locking member 13 as will directly be more fully described.

The latch member 6 is a metallic annular member which is mounted on the spindle 2 and is retained thereon by the bottom end flange 5 of the spindle. The latch means 6 consists of an annular body 10 having an upstanding off-center tongue 11 adjacent to the spindle 2, the said body 10 having an opening therethrough which receives spindle 2, the latter however being freely movable through the float relatively thereto. The bottom end of the float is formed with a slot 12 therein which loosely receives the tongue 11 of the latch member. The body 10 is substantially equal in diameter to the bottom end of the float. The slot 12 extends across the bottom end of the float through the collar C, and when the leader line 7 is wound to the extent desired, it is passed through the slot 12' and through the slot 12, and then the tongue 11 is brought into pressing engagement therewith and which secures the leader line against unwinding as long as the tongue 11 is so maintained with the body 10 of the latching member seated against the bottom end of the float and which spaces the loop 3 of rod 2 above the top surface of the float. When in this position a spacer block 13 formed of wood, plastic or of resilient material and with a slot or slit 13' adapted to receive the rod 2 when the block is inserted beneath the loop 3 and which locks and maintains the rod assembly in elevated and leader line locking position thereby preventing unwinding of said line during handling of the float.

In operation, the spacer block 13 is removed and as the cast is made the body 10 of the latch member is maintained against the bottom end of the float principally by the relationship of the areas presented by the members to the wind, their weights and the drag on the fishing line 4, attached to the loop 3, the loop 3 being held elevated from the float until the float hits the water at the desired location, thus releasing the rod 2 and enabling the latch member 6 to fall freely away from the float, thereby releasing the leader line 7 for unwinding from the float at the location in which the float is cast, and placing the baited hook in such desired location, the provision of the weight 8 on the leader line causing gravitational unwinding of the line until the weight 8 reaches the bottom of the water being fished or until the leader line is unwound completely from the float. For preventing detachment of the leader line from the float, the end of the said line opposite to that to which the hook is attached, is fastened to the float by a half-hitch or is secured by a tack or by other fastening means serving to prevent the leader line from being pulled completely from the float.

The improvements of the present invention provide a fishing float, that is certain of operation, in holding the shortened end of the leader line and hook directly beneath the float during casting and effecting the automatic releasing of the wound line as the float strikes the surface of the water at the desired fishing location, yet simple in construction, inexpensive to manufacture and efficient for the purposes intended.

It will be understood that the attached drawings and the foregoing detailed description thereof represents a preferred illustrative embodiment of the invention, but that the construction may be modified in structural details, as may be suggested to one skilled in the art without departing from the inventive concept, and accordingly it will be understood that it is intended and desired to embrace within the scope of the invention such modifications and changes as may be necessary or desired to adapt it to varying conditions and uses, as defined by the appended claims.

What is claimed is:

1. A fishing float having an upper portion and a lower portion with the center of gravity in the lower portion so that the float will float vertically in the water being fished, the float having a top end and a bottom end, the float being spool-shaped with the top end substantially larger than the bottom end, a fishing line carried by the float adjacent to the top end thereof, a leader line separate from the fishing line releasably carried on the float and having an upper end attached to the float adjacent to the bottom end of the float, the leader line also having a lower free end, the leader line being wrapped around the float when not in use, a fishing hook secured to the leader line adjacent to its free end, a retaining collar on the float adjacent to its bottom end for preventing the leader line slipping from the float, the leader line being wound around the float above the retaining collar, and means carried by the float for maintaining the leader line inactive until completion of a casting operation of the float, the said means including a spindle rod extending through and beyond each end of the float, the spindle rod having a top end defining a loop for attachment of said fishing line thereto, and having a bottom end provided with a substantially planar collar and with latching means for the leader line, the spindle rod being movable relative to the float, the retaining collar having a larger diameter than the bottom end of the float and having an off-center transverse slot extending therethrough for passage of the leader line, the said latching means having a substantially thick discal body provided with an integral, upstanding off-center locking tongue member releasably receivable in the transverse slot with the leader line extending across the slot intermediate the float and the tongue member of the latching means, a removable spacer on the top of the float encircling the spindle rod intermediate the top of the float and the loop on the spindle rod, the removable spacer when in position on the float and spindle rod raising the latter until the tongue member of the latching means is received in the off-center slot and retained therein by engagement of the bottom collar of the spindle rod while the float is not in use for holding the leader line in wound condition on the float the bottom collar of the spindle rod being retaining means for the latching means when the latter is in latching and released positions, the bottom collar of the spindle rod continuously retaining the latching means mounted on the spindle rod, the latching means thereby being automatically releasable from latching engagement with the float responsively to release of the spindle rod for free movement in the float responsive to removal of the spacer from the spindle rod, so that the leader line is released automatically for dropping the hook directly beneath the float upon completion of the cast.

2. A spool-shaped fishing float having an upper section and a lower section, the upper section being of a substantially longer diameter than the lower section, the latter tapering substantially uniformly from the upper section to a bottom end, the float having its center of gravity in the lower section so that the float will float vertically in the water being fished, the upper section of the float defining a top of the float, a spindle rod substantially longer than the float extending loosely through the float from the bottom end of the float through the top thereof, the spindle rod being freely movable with respect to the float along its longitudinal axis, the said spindle rod having an upper end terminating in a loop and a bottom end terminating in a flattened retaining head, the loosely extending spindle rod being retained by the loop at the top of the float and by the head at the bottom end of the float, an enlarged retaining collar at the bottom end of the float and integral with the float, a fishing line attached to the eye on the spindle rod, a separate leader line wrapped around the lower section of the float and retained on the float by the retaining collar, the retaining collar being provided with an off-center slot extending transversely across the collar with the leader line passing through the slot, a discal latching member mounted on the spindle rod intermediate the retaining head thereof and the bottom end of the float, and including a disc-like body of substantial thickness and a latching tongue extending upwardly therefrom and receivable in the slot in the retaining collar on the float when the latching member is in latching position with the leader line extending across the slot intermediate a side of the slot and the latching tongue for locking the leader line in wound position on the float, the latching member being mounted continuously on the spindle rod with a bottom surface of the latching member in continuous engagement with the retaining head of the spindle rod, extending and retracting movements of the spindle rod relative to the float correspondingly shifting the latching member between leader-line securing and released positions, and removable means on the top of the float and encircling the spindle rod intermediate the top of the float and the eye on the spindle rod and urging the spindle rod into extended outward position with respect to the float and causing the retaining head of the spindle rod to be moved towards the bottom end of the float for maintaining the latching member in raised latching position with the locking tongue engaging the leader line in the slot for securing the leader line against unwinding until removal of the said removable means preparatory to casting.

References Cited in the file of this patent

UNITED STATES PATENTS

| 1,427,147 | Barsch | Aug. 29, 1922 |
| 2,413,371 | Parker | Dec. 31, 1946 |
| 2,678,511 | Wright | May 18, 1954 |
| 2,720,720 | Landrum | Oct. 18, 1955 |

FOREIGN PATENTS

| 144,619 | Sweden | Mar. 23, 1954 |
| 426,129 | Italy | Oct. 21, 1947 |